United States Patent
Jamaly

(10) Patent No.: US 10,523,307 B2
(45) Date of Patent: Dec. 31, 2019

(54) MIMO COMMUNICATION SYSTEM FOR VEHICLES

(71) Applicant: Swisscom AG, Bern (CH)

(72) Inventor: Nima Jamaly, Bern (CH)

(73) Assignee: SWISSCOM AG, Bern (CH)

( * ) Notice: Subject to any disclaimer, the term of this patent is extended or adjusted under 35 U.S.C. 154(b) by 12 days.

(21) Appl. No.: 16/062,894

(22) PCT Filed: Dec. 19, 2016

(86) PCT No.: PCT/EP2016/081777
§ 371 (c)(1),
(2) Date: Jun. 15, 2018

(87) PCT Pub. No.: WO2017/103274
PCT Pub. Date: Jun. 22, 2017

(65) Prior Publication Data
US 2018/0367209 A1    Dec. 20, 2018

(30) Foreign Application Priority Data
Dec. 17, 2015    (EP) .................................... 15200896

(51) Int. Cl.
*H04B 7/155*    (2006.01)
*H04B 7/024*    (2017.01)
(Continued)

(52) U.S. Cl.
CPC ............ *H04B 7/1555* (2013.01); *B61L 1/181* (2013.01); *B61L 15/0027* (2013.01);
(Continued)

(58) Field of Classification Search
CPC ............. H04B 7/02–10; H04B 7/1555; H04W 84/005; H04W 88/085; B61L 1/181; B61L 15/0027; B61L 27/0005
See application file for complete search history.

(56) References Cited

U.S. PATENT DOCUMENTS

2013/0301604 A1    11/2013    Skov et al.

FOREIGN PATENT DOCUMENTS

EP            2645474        3/2012
WO         2015059496       4/2015

OTHER PUBLICATIONS

International Search Report for PCT/EP2016/081777, dated Mar. 14, 2017, 3 pages.

*Primary Examiner* — Raymond S Dean
(74) *Attorney, Agent, or Firm* — McAndrews, Held & Malloy, Ltd.

(57) ABSTRACT

Systems and methods are provided for multiple-input multiple-output (MIMO) based communications between moving vehicles and stationary communication systems located along tracks used by the vehicles. A vehicle-mounted system may include antenna sets, each including a plurality of antennas mounted onto a vehicle, with each plurality of antenna having at least two pairs of antennas with orthogonal polarization with respect to each other, and within each pair the antennas being configured to have full pattern diversity based on direction of travel. A stationary communication system may include antenna systems configured to provide at least two cross-polarized RF antenna patterns in the opposite directions along a particular track. The RF antenna patterns may overlap along a section of the track. The two antenna patterns may be utilized in receiving and/or transmitting two sets of different independent signal channels.

16 Claims, 6 Drawing Sheets

(51) Int. Cl.
   *B61L 15/00*      (2006.01)
   *B61L 27/00*      (2006.01)
   *H04B 7/0404*     (2017.01)
   *H04B 7/10*       (2017.01)
   *H04B 7/0408*     (2017.01)
   *B61L 1/18*       (2006.01)
   *H04B 7/0413*     (2017.01)
   *H04W 84/00*      (2009.01)
   *H04W 88/08*      (2009.01)

(52) U.S. Cl.
   CPC .......... *B61L 27/0005* (2013.01); *H04B 7/024* (2013.01); *H04B 7/0404* (2013.01); *H04B 7/0408* (2013.01); *H04B 7/0413* (2013.01); *H04B 7/10* (2013.01); *H04W 84/005* (2013.01); *H04W 88/085* (2013.01)

MIMO COMMUNICATION SYSTEM FOR VEHICLES

CLAIM OF PRIORITY

This patent application is a United States national stage entry application of International Application Serial No. PCT/EP2016/081777, filed on Dec. 19, 2016, which claims priority from European Patent Application Serial No. 15200896.7, filed on Dec. 17, 2015. Each of the above identified applications is hereby incorporated herein by reference in its entirety.

TECHNICAL FIELD

The present invention relates to the field of communications particularly to a system and a method for establishing wireless communication between a moving vehicle following a predefined path or track and base stations located along such a track.

BACKGROUND ART

The wide spread use of mobile communication devices for wireless data communication has made it a great challenge for manufacturers and operators of telecommunications networks to provide wireless data communication with sufficient bandwidth and high capacity. In particular, communication-related issues may arise in transportation-related use scenarios. For example, on trains, where typically a large number of users attempt to use fast data communication services simultaneously through the same limited number of base stations in reach of the train, it may be very difficult to provide sufficient data communication capacity for a passing train. Moreover, the tremendous increase of the speed of trains has augmented this problem as data communication resources need to be provided very quickly, with great bandwidth and high capacity, and for very short periods of time between handovers.

In the U.S. Pat. No. 5,548,835 (NEC CORP) 12 Feb. 1994 a train radio communication system is described including a plurality of land communication equipment and a train communication equipment. The land communication equipment is arranged at predetermined intervals along a railroad on which a train travels and designed to output transmission signals at different frequencies. The train communication equipment is arranged in the train and designed to set a radio channel between the train communication equipment and one of the land communication equipment during travel of the train. The train communication equipment includes a plurality of antennas, an antenna switch, a receiver, and an antenna controller. The antennas respectively receive the transmission signals from the land communication equipment. The antenna switch selects one of the antennas. The receiver demodulates an output from the antenna selected by the antenna switch and outputs a reception signal. The antenna controller includes a current position detecting section for detecting a current traveling position of the train and controls the antenna switch in accordance with a current traveling position from the current position detecting section.

US2014198715 (SWISSCOM AG) 17 Aug. 2014 describes methods and systems for establishing wireless communication between a train and one or more base stations arranged along a track travelled by the train and may comprise setting up communication channels between one or more antennas of communication relays on the train and one or more antennas of the base stations. Channel state information (CSI) may be determined and stored in a data store, and the CSI may be used for communicating via the communication channels, depending on information defining the current location of the communication relays. The CSI can be used to establish several independent communication channels for MIMO (multiple in/multiple out) communication between the base station or base stations and relays or antenna systems mounted on the train.

SUMMARY OF INVENTION

Given the complexity and ensuing sensitivity of the above methods and apparatus to establish a MIMO link to the moving train, it is seen as an object of the invention to provide an alternative method and system being preferably more robust and simpler to operate for such communication.

The present invention addresses the foregoing needs by providing, inter alia, a MIMO communication system for vehicles as set forth in the appended claims. Optional features are presented in the description which follows.

It seems advantageous that a fast, reliable, and cost efficient 4×4 MIMO communication link can be provided between devices operated by passengers within the vehicle and the stationary network of a mobile operator.

These aspects and other features, aspects and embodiments of the invention will be more readily understood upon consideration of the following detailed description and of the attached drawings as listed below.

DESCRIPTION OF EMBODIMENTS

Figure 1A:
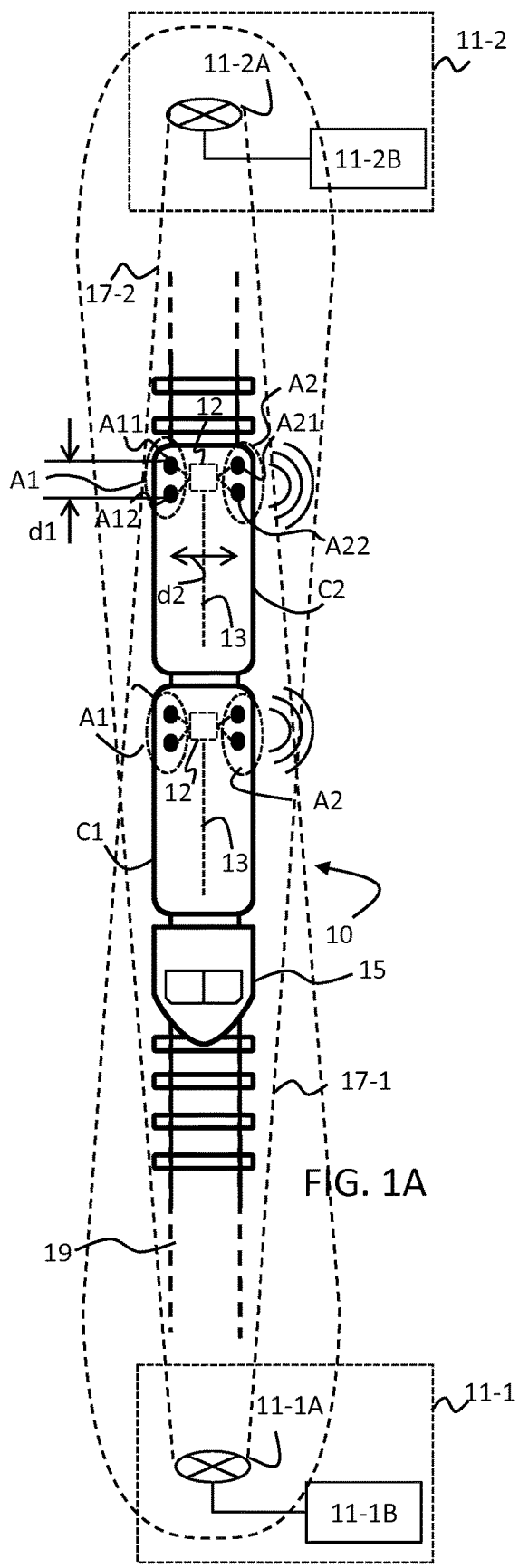
FIG. 1A shows an exemplary train in the vicinity of a first MIMO stationary communication system.

FIG. 1A is a diagram illustrating schematically a top view of a train 10 moving between two stationary antenna stations 11-1, 11-2. The train 10 comprises a locomotive 15 and a number of coaches, of which coaches C1 and C2 are illustrated. The train 10 is moving on railroad tracks 19.

There is further shown a first antenna station 11-1 comprising a first transceiver 11-1B communicatively coupled to a first antenna system 11-1A. The antenna system 11-1A may generate an illustrative first radiation pattern, referred to as RF antenna corridor 17-1.

There is further shown a second antenna station 11-2 comprising a second transceiver 11-2B communicatively coupled to a second antenna system 11-2A. The antenna system 11-2A may generate an illustrative second radiation pattern, referred to as RF antenna corridor 17-2. As shown The first radiation pattern 17-1 and the second radiation pattern 17-2 may overlap along at least a section of the track 19 located between the position of the first antenna system 11-1A and the position of the second antenna system 11-2A.

A coach C1, C2 may comprise an interior antenna 13, a signal repeater 12, a set of antennas A1, and a set of antennas A2 or similar equipment for communicating signal between the interior and the exterior of each coach. The set of antenna A1 may comprise a plurality of antennas, of which two, A11 and A12, are illustrated as black dots (not labelled on C1 for clarity of illustration). The set of antennas A2 similarly comprises a plurality of antennas, of which two, A21 and A22, are illustrated as black dots (not labelled on C1 for clarity of illustration). The antennas A11 and A12 are separated by distance d1. Similarly, the antennas A21 and A22 are separated by distance d1. The sets of antennas A1 and A2 are separated by distance d2, as illustrated by the distance d2 between antennas A12 and A22. Generally, the antennas of one set e.g. A1 are mounted on opposite sides of the vehicle with respect to those of the other set e.g. A2. Typically the line of sight between both set of antennas A1, A2 may be interrupted by the curved roof 101 of the train. In FIG. 1A, the antennas A11 and A12 of the set A1 are mounted on the right side (in the direction of travel) while the antennas A21 and A22 of the set A2 are mounted on the left side. The signal repeater 12 is communicatively coupled to the interior antenna 13 and to the sets of antennas A1 and A2.

The antennas A11, A12 of the antenna set A1 may show pattern diversity with the antenna A12 having a favourable reception/transmission area or pattern direction oriented in a different, possibly opposite, direction to the favourable reception/transmission area or pattern direction of the antenna A11. Taking, for example, the direction of travel of the train 10 as a reference, the pattern direction of the antenna A11 may point to the back of the train 10 whilst the favourable reception/transmission area of the antenna A12 points in direction of travel. The antennas A21, A22 of the antenna set A2 are typically configured in a substantially similar manner. As a result, there are e.g. two antennas A12, A22 configured with favourable reception/transmission areas directed to the front of the train 10 and two antennas A11, A21 configured with favourable reception and/or transmission areas or directivity directed to the back of the train 10.

The train 10 is powered by a locomotive 15 that is mechanically coupled to the coaches C1, C2 as illustrated and moves the train 10 or away from the antenna stations 11-1,11-2 as positioned along the railroad track 19.

The antenna stations 11-1, 11-2 may be operable to transmit and/or receive radio frequency signals in accordance with one or more RF technologies, for example mobile communication standards such as commonly referred to as 4G, LTE, HSDPA, or 5G.

The antenna station 11-1 comprises a transceiver 11-1B, which comprises suitable logic, circuitry and/or code to generate and process radio and/or baseband signals in accordance with mobile communication standards, and an antenna system 11-1A. The transceiver 11-1B may be connected to a suitable antenna system, for example, a distributed antenna system (DAS) as described below.

Signals received and/or generated at the transceiver 11-1B, respectively, are transmitted/received through the antenna system 11-1A. The antenna system 11-1A may comprise one or more antennas in general but may typically comprise a plurality of antennas in order to allow various protocols of multiple-input multiple-output (MIMO) communications such as 2×2 communications with a mobile transceiver system such as the exemplary ones illustrated for train coaches C1, C2, for example.

For example, antenna system 11-1A may be configured to receive and transmit cross-polarized RF signals, i.e., receive and transmit two signals concurrently that are polarized differently, for example horizontally and vertically or at +/−45 degrees, respectively. The antenna system 11-1A in conjunction with further sets of antennas as described below may also be suitably configured to support other MIMO schemes, such as 4×4 MIMO, in accordance with various embodiments of the invention.

The antenna system 11-1A may be configured such that it receives and transmits favourably (or has a pattern directivity) along the railroad tracks 19. Such a favourable reception/transmission area is illustrated by the exemplary RF antenna corridor 17-1, which can also be regarded as an illustration of the pattern of the antenna system 11-1A.

A second antenna station 11-2 is separated from the first antenna station 11-1 along the track 19. The distance between adjacent antenna stations which may be determined by the constrains of the type of communication, available signal strength, topography etc., and can for example be in the range of 40 to 5000 meters or in the range of 500 to 2000 meters. The second antenna station 11-2 is configured similarly to the first antenna station 11-1. The favourable reception/transmission area or the radiation pattern of the antenna system 11-2A as illustrated by the exemplary RF antenna corridor 17-2 is, however, typically oriented in an opposite or different direction to the RF antenna corridor or radiation pattern 17-1 of the first antenna system 11-1A. Thus, at the first antenna station 11-1 an RF antenna corridor or radiation pattern 17-1 may be directed along the track 19 in direction of the neighbouring second antenna station 11-2. At the second antenna station 11-2 an RF antenna corridor or radiation pattern 17-2 may be directed along the track 19 in direction of the neighbouring first antenna station 11-1. The RF antenna corridors or pattern 17-1, 17-2 may overlap along a section of the track located between both stations 11-1, 11-2.

It is clear to the person skilled in the art that antenna stations 11-1 and 11-2 may comprise multiple antenna sectors or radiation patterns with one or more antenna systems 11-1A, 11-1B, which may radiate in a plurality of directions, for example if an antenna station, e.g. 11-1, is placed alongside track 19, there may be a RF antenna corridor in each direction of the track leading away from the antenna station.

Thus, in a series of antenna stations, each antenna station may comprise a part configured as the first antenna station 11-1 and a part configured as the second antenna station 11-2 thus providing an RF antenna corridor 17-1 in one direction along the track 19 and an RF antenna corridor 17-2 in the opposite direction. Together with the neighbouring antenna stations, it may thus be possible to cover entire sections of the track 19 with overlapping RF antenna corridors, e.g. 17-1, 17-2.

The coaches C1, C2 may be adapted to any purpose including, but not limited to, the carriage of persons and/or goods. The interior antenna 13 may comprise suitable logic, circuitry and/or code to receive and transmit radio frequency signals to and from mobile transceivers typically located inside the carriage (not shown), for example inside the carriages C1, C2, in which interior antennas 13 are located. The mobile transceivers receiving from or transmitting to the interior antenna 13 may be mobile handsets or computers operated by train passengers, or may be machine-operated mobile communication transceiver such as those used for machine-to-machine communications, for example. The interior antenna 13 is typically placed in the interior of a carriage and may comprise any type of RF antenna type suitable for its operating frequencies. This may include printed antennas, leaky feeders, or any other antenna technology adapted to a mobile communications technology, as will be clear to a person skilled in the art.

The signal repeater 12 may comprise suitable logic, circuitry, and/or code to process radio signals received from the interior antenna 13 or the sets of antennas A1, A2. Moreover, the signal repeater 12 may be operable to control, configure and adapt the configuration of the sets of antennas A1 and A2. Similarly, the signal repeater 12 is operable to process radio signals for transmission over the interior antenna 13 or the sets of antennas A1, A2. The signal repeater 12 may further comprise suitable logic, circuitry, and/or code to balance signals of multiple, e.g. 4 signals channels as received or transmitted by the antennas A11, A12, A21, A22.

Typically, in a downlink scenario, a signal repeater 12 may receive radio signals transmitted from e.g. antenna station 11-1 via one or more of the antenna sets A1, A2. The signals may then be processed for retransmission over the interior antenna 13. The processing may comprise, but is not limited to, amplifying, decoding and/or re-encoding of the radio signal and may be at radio frequency, intermediate frequencies, or baseband frequencies, in accordance with various embodiments of the invention. Similarly, in an uplink scenario, the signal repeater 12 may receive radio signals on the interior antenna 13 and process these suitably for transmission via the sets of antennas A1, A2 to a receiver, for example antenna station 11-1, 11-2.

The set of antennas A1, A2 may comprise suitable logic, circuitry and/or code to receive and transmit radio signals in accordance with a radio communications protocol suitable for reception from and transmission to an antenna station 11-1, 11-2. This may, as described above for antenna station 11-1, 11-2, typically comprise one or more mobile communications protocols/standards. The set of antennas A1, A2 may be operable to utilize multiple antenna protocols, for example multiple-input multiple-output (MIMO), particularly a 4×4 MIMO, using the exemplary plurality of antennas A11, A12 and A21, A22, respectively. The antennas A11, A12, A21, A22 may comprise suitable logic, circuitry and/or code to receive and transmit radio frequency signals at their respective operating radio frequency.

Figure 1B:
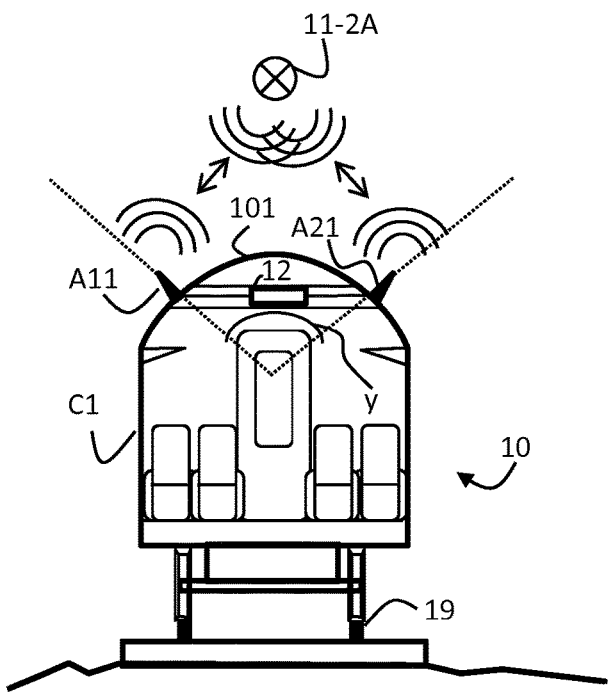
FIG. 1B shows a schematic cross-section of the exemplary train in FIG. 1A.

FIG. 1B shows an exemplary schematic cross-section of the train in FIG. 1A. Referring to FIG. 1B, there is shown a coach C1 of a train 10 on a railway track 19 and an illustrative transceiver antenna system 11-2A. The cross-section of the coach C1 further shows an antenna A11 and an antenna A21. The antenna A11 is for example part of the antenna set A1 as shown in FIG. 1A. The antenna A21 is for example part of the antenna set A2 as shown in FIG. 1A. There is further shown a train roof 101, which is typically made of an electrically conducting material, e.g. metal.

There is also shown an angle y between some axis of antennas A11 and antenna A21, due primarily to the location and orientation of the antennas A11 and A21 on the roof 101. The orientations or polarization of the antennas of a set can also be regarded as the orientation of the antenna sets A1, A2. The reference numbers used in FIG. 1B correspond to the respective elements shown and described for FIG. 1A.

As illustrated, a transceiver antenna system 11-2A of a stationary communication system may be located at a height greater than the height of the train 10. When, as shown in FIG. 1A, the antenna system 11-2A is located behind the current position of the train 10 with an essentially obstacle-free RF antenna corridor 17-2, a line-of-sight (LOS) communication channel may be established with the antennas A11, A21. Both antennas A11 and A21 may be directed with their favourable reception/transmission area towards the back of the train 10 as described above. The antennas A12, A22, which may be directed with their favourable reception/transmission area towards the front of the train 10, may communicate with the antenna station 11-1 via the antenna system 11-1A in similar manner (but are not shown in FIG. 1B).

The train roof 101 may typically be curved (or arched) or otherwise be of a convex shape as seen in the exemplary cross-section of FIG. 1B. For example, the roof 101 may be convex but approach the illustrated curved roof 101 through a plurality of straight segments. The angle y may advantageously be chosen to be close to 90 degrees and may in practice be approximately 70-110 degrees. In this exemplary configuration with an angle y of approximately 90 degrees, the antennas A11 and A21 may be operable to receive and transmit RF fields that may be cross-polarized with respect to each other. For example, antenna A11 may receive from the transceiver antenna system 11-2A primarily a signal component of a transmitted cross-polarized RF signal with −45 degree polarization, and antenna A21 may receive from the transceiver antenna system 11-2A primarily a signal component of a transmitted cross-polarized RF signal with +45 degree polarization. The orientation in which the antennas A11 and A21 are illustrated in FIG. 1B is meant to correspond with their respective polarization in this example. The conductive roof may act as ground plate of the antennas A11, A21, A12, and A22. As will be known to a person skilled in the art, such an arrangement can similarly be used to transmit a cross-polarized signal via antennas A11 and A21.

The different angular positioning of antennas (as illustrated by angle y), enable the received signals at the antennas A11 and A21 to be approximately orthogonal due to polarization diversity and thus uncorrelated. Correspondingly, such a setup may be suitable for a variety of multiple antenna protocols, including MIMO. If, for example, the transceiver antenna system 11-2A employs two cross-polarized antennas, a 2×2 MIMO channel may be created between the antennas A11 and A21 of a coach (e.g. C2) and the antenna system 11-2A.

The antennas A12, A22 (not shown in FIG. 1B) may be mounted in a similar manner to antennas A11, A21 onto the roof 101 of the train 10. Similarly, the different angular positioning of antennas A12, A22 also enable the received signals at the antennas A12 and A22 to be approximately orthogonal and uncorrelated and thus to be used in a variety of multiple antenna protocols, including MIMO. If, for example, the antenna system 11-1A (not shown in FIG. 1B) employs two cross-polarized antennas, an effective 2×2 MIMO channel may be created between the antennas A12 and A22 of a coach (e.g. C1) and the antenna system 11-1A.

In combination, the first antenna system 11-1A and the second antenna system 11-2A together with the antennas A11, A21, A12, A22 may form an effective 4×4 MIMO channel between a coach C1, C2 of the train 10 and, the antenna systems 11-1 and 11-2, which may operate in a coordinated fashion via some backend (not shown).

During the operation of such a system, the train 10 traverses e.g. a section of track 19 between antenna station 11-2 and antenna station 11-1 by first passing through a zone in which a first of the antennas 11-2A, exhibits a higher signal strength than antenna system 11-1A with respect to a coach, e.g. C1. Then it passes through a zone in which the signal strengths of both antennae are similar and finally through a zone in which the second of the two antenna 11-1A exhibits a higher signal strength. This pattern is repeated as a train 10 passes through various antenna systems located along the track 19. When the train 10 passes through the same section of track 19 in reverse direction, this pattern of zones is traversed in reverse direction, as will be clear to a person skilled in the art Several ways of balancing transmit and/or receive signal powers from antenna systems 11-1A, 11-2A can be envisaged. In accordance with various embodiments of the invention, balanced signal power, e.g. received signal power at antennas A11, A12, A21, A22 (or subsets thereof) may be advantageous for some MIMO protocols. In one exemplary embodiment, signal balancing can be performed by the repeater 12 on the coaches C1, C2 by amplifying or attenuating the respective signals from/to the antennas A11, A12, A21, A22. However, in other embodiments, balancing may be performed by for example reducing or increasing the strength of the signals as emitted by the stationary antenna stations 11-1, 11-2. In the latter case, much of the additional signal processing required to operate the above described communication system in a 4×4 mode may be performed by parts, e.g., the transceivers 11-1B, 11-2B, of the stationary communication system 11-1, 11-2.

Figure 2A:
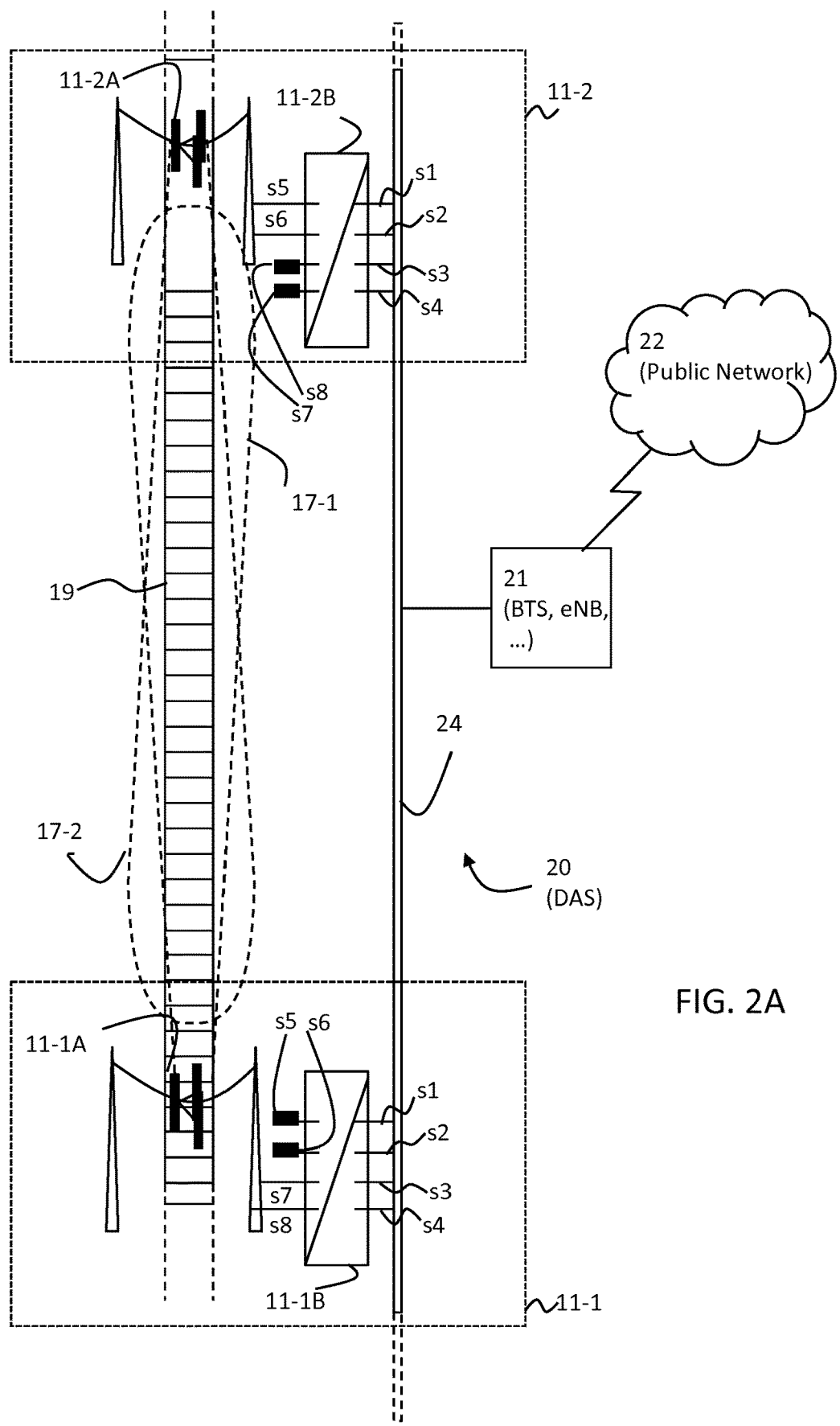
FIG. 2A illustrates details of an exemplary distributed antenna system.

FIG. 2A shows an exemplary system and method to distribute the communication signals to and from the antenna stations 11-1 and 11-2. The figure shows two neighbouring antenna stations 11-1, 11-2 along a track 19, each comprising an antenna system 11-1A, 11-2A and a transceiver 11-1B, 11-2B. Each antenna system 11-1A, 11-2A is symbolically depicted in FIG. 2A as a cluster of antennas mounted on masts suspended over the track 19. As will be clear to the person skilled in the art, the illustrated mounting of antenna systems 11-1A, 11-2A is exemplary and the antenna systems may alternatively be mounted on e.g. a single mast besides the track 19 or on some other structure. The antenna systems 11-1A, 11-2A and their respective RF antenna corridors 17-1, 17-2 are substantially similar to the antenna systems 11-1A, 11-2A and the RF antenna corridors 17-1, 17-2 as described above referencing FIGS. 1A and 1B.

Each transceiver 11-1B, 11-2B is shown with eight transceiver ports s1 through s8 providing signals paths between the antenna system 11-1A, 11-2A and a distributed antenna system (DAS) 20, respectively. The DAS 20 comprises a backbone 24 and a base station (BTS) 21. The backbone 24 communicatively couples the transceivers 11-1B, 11-2B to a base station 21. The base station 21 connects signal paths from the antenna stations 11-1, 11-2 to other parts of the network, for example a public network 22. The base station 21 may comprise suitable logic, circuitry, and/or code to process signals to/from the public network 22 for transmission and reception via the backbone 24 to the antenna stations 11-1, 11-2. The base station 21 may control, configure and adapt the functions of the antenna stations 11-1, 11-2 to operate in accordance with various embodiments of a distributed antenna system protocol. For example, the base station 21 may process a plurality of signals in a suitable manner for transmission via the antenna stations 11-1, 11-2 and may configure the antenna stations 11-1, 11-2 to transmit a subset of the signals present over the backbone 24. Similarly, the base station 21 may configure and adapt the reception of signals from the antenna stations 11-1, 11-2. The backbone 24 may comprise suitable logic, circuitry and/or code to enable signal transfer between the base station 21 and the antenna stations 11-1, 11-2. The backbone 24, may be based on an optical link using fibre optical cabling, or may comprise coaxial cabling for electrical transmission/reception, for example. The public network 22 may comprise suitable logic, circuitry, and/or code such that it may interconnect various networks (e.g. Internet, PSTN etc.) to the mobile network comprising base station 21.

In operation, the transceivers 11-1B, 11-2B may be connected for the transmission and reception of signals through either a digital or analogue distributed backbone 24 of the antenna system (DAS) 20. A DAS 20 may transmit/receive the signals from a base station 21 (BTS/eNB), which in turn is connected to the network 22, and distributes signals to a number of antenna stations 11-1, 11-2 located along the track 19 and separated for example by tens to 1000 s of meters. The transceivers 11-1B, 11-2B may comprise an optical/RF converter to convert signals from the optical domain into the radio frequency domain and vice versa. The transceivers 11-1B, 11-2B may comprise suitable logic, circuitry and/or logic to receive/transmit e.g. optical signals at the transceiver ports s1 to s4 for transmission/reception over the transceiver ports s5 to s8 as e.g. radio frequency signal after conversion.

The RF signals may be sent to and from the antenna systems 11-1A, 11-2A by suitable RF coaxial cables or other suitable connection. It is clear to the person skilled in the art that no conversion from the optical domain to the electrical domain, or vice versa, is necessary. if the backbone 24 is not optical.

In case of a 4×4 MIMO downlink, for example, the DAS system 20 may carry four signal channels to the transceivers 11-1B and 11-2B, via the transceiver ports s1-s8 and via the backbone 24. To avoid critical delays between the four MIMO signals at the transceiver ports s1-s4, which for example for the LTE system should not exceed 60 ns, the 4 signals may be distributed to the antenna stations 11-1, 11-2 over the DAS 20 so that for example all four signals arrive at the same antenna station at the approximately same time. At the transceivers 11-1B, 11-2B of neighbouring antenna stations 11-1, 11-2 only those signals required for the RF signal at the respective antenna station are electrically coupled to the respective antenna systems 11-1A, 11-2B while the channels not required may be terminated, e.g., by a 50 Ohm termination (50Ω), or otherwise not be coupled to the antenna system 11-1A, 11-2A.

For example, as symbolically illustrated in FIG. 2A, in a downlink scenario the signals received at transceiver ports s1 and s2 of transceiver 11-2B may, after suitable processing, be output via transceiver ports s5 and s6, respectively, for transmission via the antenna system 11-2A. The signals received at transceiver ports s3, s4 may be terminated at transceiver ports s7, s8, for example. Similarly, the signals received at transceiver ports s3 and s4 of transceiver 11-1B may, after suitable processing, be output via transceiver ports s7 and s8, respectively, for transmission via the antenna system 11-2A, while the signals received at transceiver ports s1, s2 of transceiver 11-1B may be terminated at transceiver ports s5, s6, for example. In accordance with various embodiments of the invention, a 4×4 MIMO system as illustrated in FIG. 2A may transmit a subset of signals via antenna station 11-2 and another subset of signals via antenna station 11-1. In the present downlink example, two signals may be transmitted via antenna station 11-1 and two different signals may be transmitted via antenna station 11-2, for example. As will be understood by a person skilled in the art, the subsets of signals transmitted from each antenna station may intersect, in accordance with various MIMO protocols that may be employed. An uplink scenario may be substantially similar, as will be understood by a person skilled in the art.

For example, as illustrated in FIG. 2A and described above, e.g. signals at transceiver ports s5 and s6 may be transmitted over differently polarized (cross-polarized) antennas at the antenna system 11-2A (and similarly for 11-1A, the signals at transceiver ports s7, s8, respectively). A relatively robust 4×4 MIMO communication system with tolerable channel delays can be implemented in this manner, particularly when distributing channels through the same DAS to each of the antenna stations in the manner as described above.

Figure 2B:
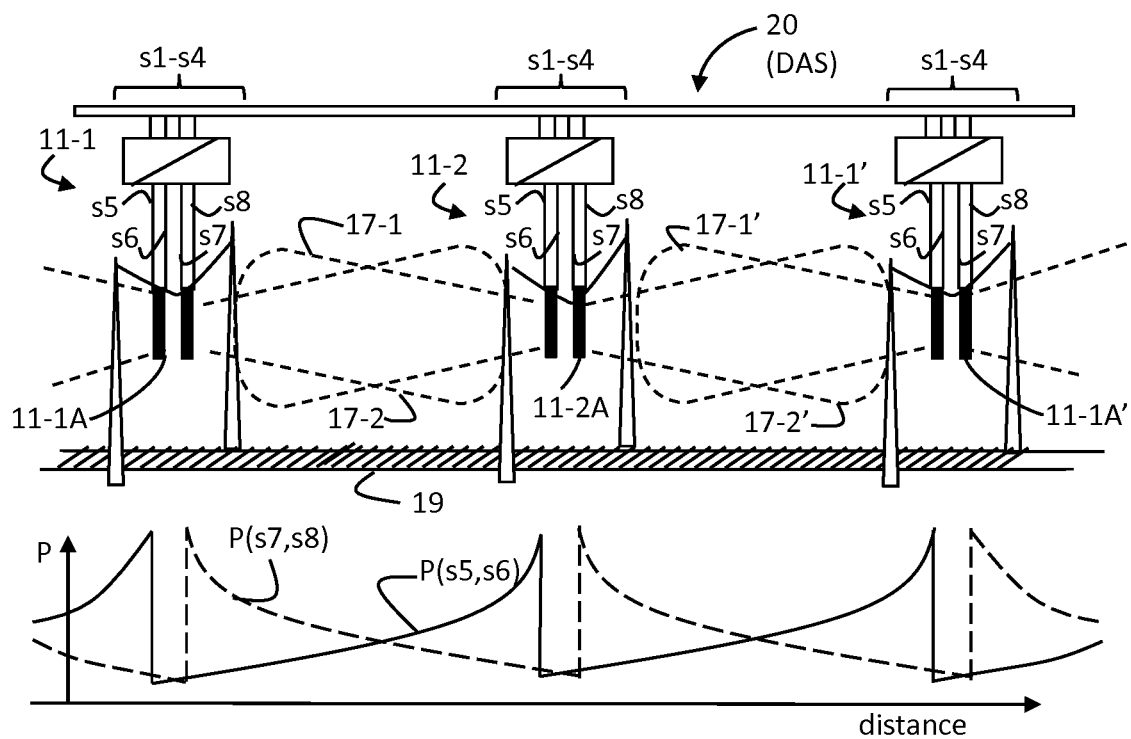
FIG. 2B illustrates details of an exemplary first connection scheme of a distributed antenna system with the antennas of the first MIMO stationary communication system and the resulting emission power along the track.
Figure 2C:
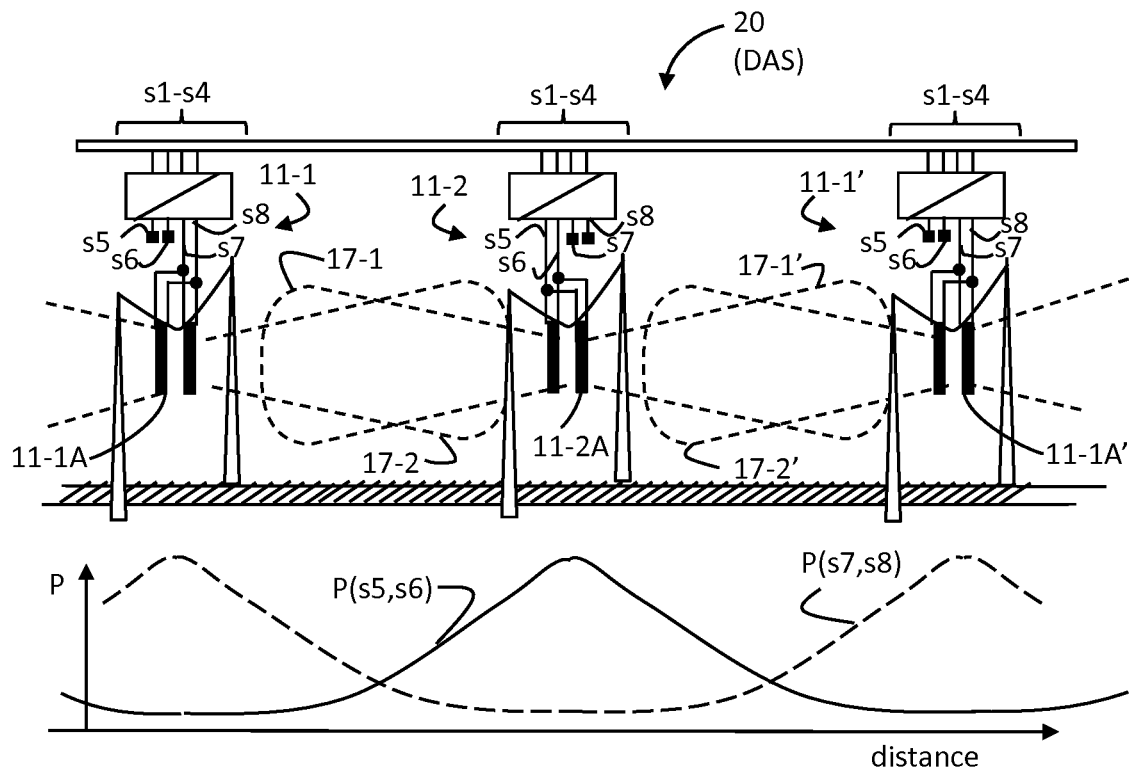
FIG. 2C illustrates details of an exemplary second connection scheme of the distributed antenna system with the antennas of the first MIMO stationary communication system and the resulting emission power along the track.

Possible advantages of choosing a port configuration scheme at the neighbouring transceivers 11-1B, 11,2B as illustrated in FIG. 2A are further illustrated using FIGS. 2B and 2C.

Both FIG. 2B and FIG. 2C include an upper and a lower panel. The upper panel of each figure illustrates schematically the port configuration scheme used at three antenna stations 11-1, 11-2, 11-1' comprising antenna systems 11-1A, 11-2A, 11-1A' to generate neighbouring overlapping RF antenna corridors 17-1, 17-2 and 17-1', 17-2' respectively along the track 19, and connected to a DAS 20. Exemplary transceiver ports s1 through s8 are illustrated. The lower panel of each figure illustrates schematically the corresponding signal strength or power received for the signals channels s5-s8 as a function of distance along the track 19.

Typically a larger section of the track 19 may be covered for communication purposes by distributing a plurality of antenna stations such as stations 11-1, 11-1' 11-2 along the track 19. Each station 11-1, 11-1' 11-2 may be configured to provide an antenna corridor 17-1, 17-1' directed along the track 19 in one direction (for convenience referred to as "forward" direction) and an antenna corridor 17-2, 17-2' directed in another, generally opposite, direction (for convenience referred to as "backward" direction). As a result there are pairs of overlapping RF corridors along the track 19, such as the overlapping RF corridors 17-1, 17-2 and the overlapping RF corridors 17-1' and 17-2', respectively.

The port configuration scheme of FIG. 2B differs from the one illustrated in FIG. 2C (and hence in FIG. 2A) in that of the four input signal channels s1-s4 as provided by the DAS system 20 at each of the antenna stations 11-1, 11-1' 11-2 are processed differently. In FIG. 2B, the first two output signal channels s5, s6 (based on input signals at e.g. s1, s2) are coupled to the antenna systems generating the forward directed RF corridors 17-1, 17-1', and the two output signal channels s7, s8 (based on input signals at e.g. s3, s4) are coupled to the antenna systems generating the backward directed RF corridors 17-2, 17-2'. In the example of FIG. 2C, on the other hand, which represents essentially the same input port configuration s1-s4 as illustrated in FIG. 2A, at each antenna station 11-1, 11-1' 11-2 only two of the four input signal channels s1-s4 are processed. In this case, two of the output ports are coupled to the antenna systems generating the RF corridors, such that the same output signal ports are coupled at the antenna stations generating both the forward and backward directed RF corridors 17-1, 17-2, 17-1', 17-2', while the other two signal channels are not used. Which two output ports are coupled to the antenna stations alternates from antenna station to antenna station. For example, the output ports s7, s8 (based on input signals at e.g. ports s3, s4) are passed through at antenna station 11-1, the output ports s5, s6 (based on input signals at e.g. ports s1, s2) are passed through at antenna station 11-2, the output ports s7, s8 (based on input signals at e.g. ports s3, s4) are passed through at antenna station 11-1', etc. With this scheme it is again ensured that all four input channels s1-s4 are present in their processed form at ports s5-s8 in the overlapping RF corridors along the track 19.

It should be noted that the configuration scheme as used in the example of FIG. 2B makes use of the RF ports s4-s8 of the transceiver for signal transmission, whereas in the embodiments of FIG. 2A and FIG. 2C two of these ports are terminated.

According to the system illustrated in FIG. 2B, at each of the antenna stations 11-1, 11-1' 11-2 one antenna corridor 17-1, 17-1' is used for carrying the input signals s1, s2 in one direction (via ports s5, s6), and one antenna corridor 17-2, 17-2' is used for carrying the input signals s3, s4 in the opposite direction (via ports s7, s8). Taking for example the central antenna station 11-2 as shown in FIG. 2B, the station 11-2 establishes an antenna corridor 17-1 for the output signals at ports s5, s6 based on the input signals at s1, s2 directed forward (to the left in the panel), and an antenna corridor 17-2 for the output signals at ports s7, s8 based on the input signals at s3, s4 directed backward (to the right in the panel). The 4×4 signal coverage along the track 19 to the left of the station 11-2 is complemented by the overlapping antenna corridor 17-2 from station 11-1, and to the right by the overlapping antenna corridor 17-1' from station 11-1'.

In the lower panel of FIG. 2B, the emission signal strength or power P along the track 19 is schematically illustrated for an exemplary downlink. The horizontal axis shows distance along the track 19 and the vertical axis shows signal power P. It can be noted that the configuration scheme as shown in the upper panel of FIG. 2B leads to a sudden change in signal strength at the passing of each of the antenna station 11-1, 11-2, 11-1'. Taking again the central antenna station 11-2 as an example and assuming a train passes from the left to the right, the signal channel strength P(s5, s6) for the signals from output ports s5, s6 may jump from maximum strength as a train approaches the station and thus the source of the antenna corridor 17-1, to the lowest signal strength of the antenna corridor 17-1' for the same signal as emitted from the antenna station 11-1' to the right. The reverse holds for the signal channel strength P(s7,s8), as can be seen from the illustration in the lower panel of FIG. 2B. Here, the signal strength is at its lowest as the train approaches the middle antenna station 11-2 and jumps to its maximum immediately after passing the antenna station 11-2. Such sudden jumps in the signal strength on a single channel may be undesirable, in particular for the signal repeater 12.

To avoid such sudden changes in signal strength, the port configuration illustrated in FIGS. 2C (and 2A) may be used. Taking again the example of the central antenna station 11-2 of FIG. 2C, an antenna corridor 17-1 for the signals on ports s5, s6 (based on input signals at e.g. s1, s2) is generated to the left, and an antenna corridor for 17-1' to the right. The two neighbouring antenna stations 11-1 and 11-1' establish the antenna corridors 17-2 and 17-2' for signals at output ports s7, s8 (based on input signals at e.g. s3, s4), complementary to signals from antenna station 11-2 in the middle.

The lower panel of FIG. 2C shows the resulting signal strength P(s5,s6), P(s7,s8) for the processed input signal channels s1, s2, s3,s4 and associated output signal ports s5, s6, s7, s8, respectively. As a result of the configuration scheme the signal strength P(s6,s6) have a maximum in the vicinity of the middle station 11-2 and gradually taper to a minimum in the vicinity of the two neighbouring stations 11-1, 11-1'. Steep changes or jumps of the signals strength such as shown in FIG. 2B may be avoided. As a result for such a configuration scheme, a 4×4 MIMO channel coverage along the track 19 may be established with fewer abrupt changes in signal strength along the track 19.

The potential 4×4 MIMO communication system as described in FIGS. 1 and 2 may be further complemented by one or more further 4×4 MIMO communication systems based on different principles. Using different systems along a track enables a network operator to adapt the communication system to different location settings, different infrastructure requirements and different regulatory requirements. With this background, it is seen as a possibility to use for example leaky feeder cables (LFCs), sometimes also referred to as radiating cables, for such a complimentary 4×4 MIMO communication system along stretches of the track 19 which are not covered by a 4×4 MIMO communication system as described in FIGS. 1 and 2.

Figure 3A:
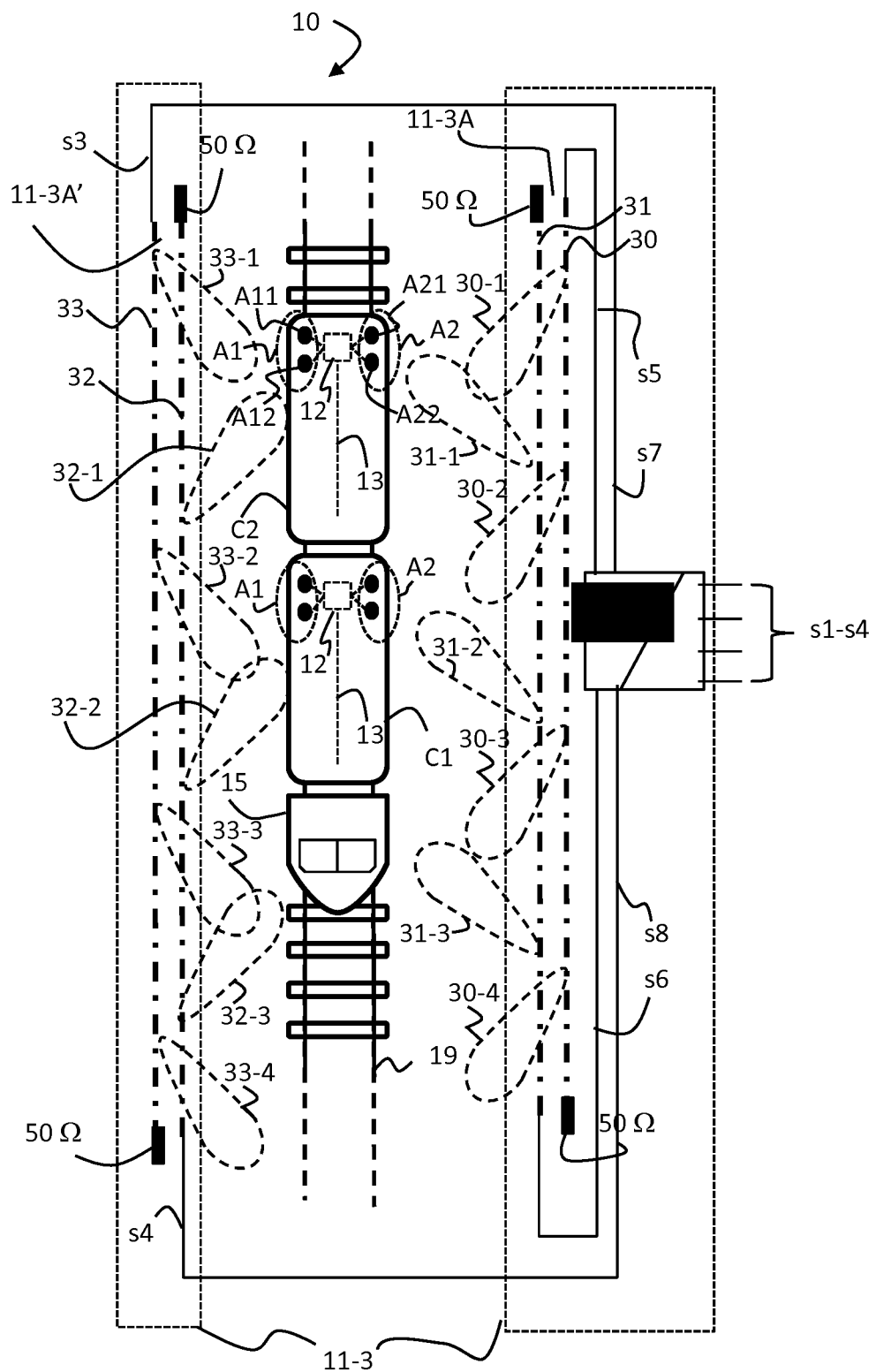
FIG. 3A shows an exemplary train in the vicinity of a second stationary communication system.

FIG. 3A shows an example of a train in the vicinity of a second stationary communication system using LFCs. There is shown a train 10, railroad tracks 19, and antenna station 11-3. The antenna station 11-3 may comprise a transceiver 11-3B communicatively coupled to antenna systems 11-3A, 11-3A'. The antenna systems 11-3A, 11-3A' may comprise a plurality of leaky feeder cables, illustrated by the dot-dashed lines 30, 31 for antenna system 11-3A on one side of the track 19, and a second set of LFCs 32, 33 for antenna system 11-3A' on the other side of the track. There are shown exemplary radiation patterns 30-1, 30-2, 30-3, 30-4 associated with LFC 30, radiation patterns 31-1, 31-2, 31-3 associated with LFC 31, radiation patterns 32-1, 32-2, 32-3 associated with LFC 32, and radiation patterns 33-1, 33-2, 33-3, 33-4 associated with LFC 33. Exemplary radiation patterns 30-1, 30-2, 30-3, 30-4 may be referred to, as a group, simply as radiation pattern 30, and similar for the radiation patterns for LFCs 31, 32, and 33. The transceiver 11-3B may be connected to a DAS system 20 (not shown) as described above with reference to FIG. 2A. The DAS system 20 may transmit and receive four signal channels s1-s4 from/to the transceiver 11-3B. Of the four input signal channels, two associated output channels s5, s6 may be coupled to the LFC antenna system 11-3A located on the right side of the track 19 and two channels s7, s8 may be coupled to the LFC antenna system 11-3A' located on the left right side of the track. Thus for a 4×4 MIMO communication the channels are split between LFC on both sides of the track 19.

The reference numbers in FIG. 3A may refer to substantially similar elements with the same numbers as described for FIG. 1A, FIG. 1B, and FIG. 2A-2C.

The leaky feeders 30, 31, 32, 33 of antenna systems 11-3A, 11-3A' in transceiver antenna system 11-3 may be operable to transmit and/or receive radio frequency signal in accordance with one or more RF technologies, for example mobile communication standards such as, 4G, LTE, or 5G, WiMAX 802.16. The leaky feeder cables 30-33 of transceiver antenna system 11-3 may run approximately parallel to the railroad track 19.

Figure 3B:
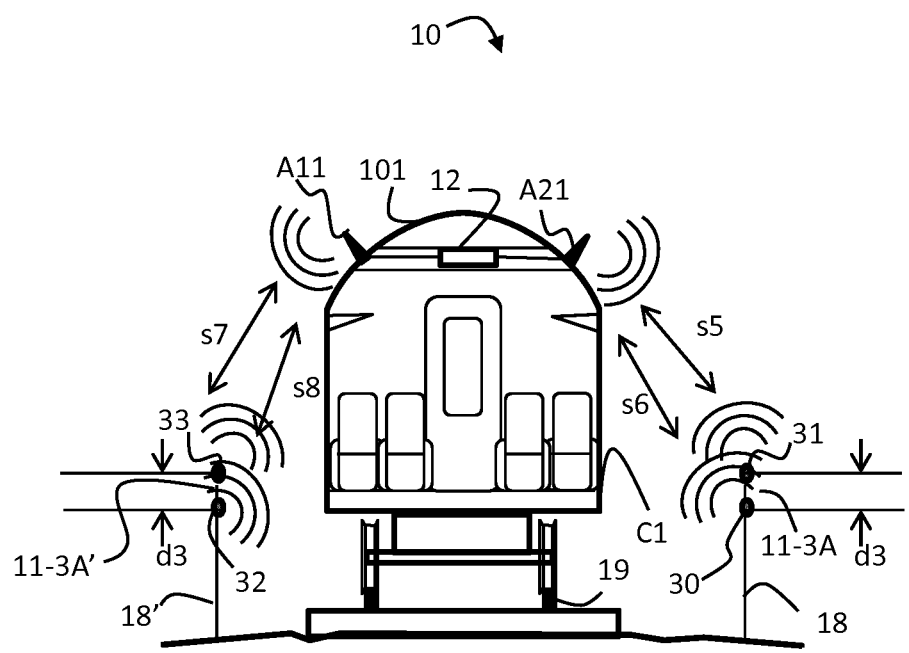
FIG. 3B shows an exemplary schematic cross-section of the train in FIG. 3A.

FIG. 3B shows an exemplary schematic cross-section of the train in FIG. 3A. An antenna station 11-3 (not shown) may comprise a plurality of leaky feeder cables of the antenna systems 11-3A, 11-3A', of which LFCs 30, 31 are illustrated for antenna systems 11-3A as dots on the right side of the track 19, mounted on a mount 18, and of which LFCs 32, 33 are illustrated for antenna system 11-3A' as dots on the left side of the track 19, mounted on a mount 18'. There is also shown a leaky feeder separation distance d3 which is typically equal for both sets of antennas 30, 31 and 32, 33 of 11-3A, 11-3A'. The reference numbers in FIG. 3B may refer to substantially similar elements with the same numbers as described for FIG. 1A, FIG. 1B, and FIG. 2.

The mounts 18, 18' may be enabled to mount the leaky feeder cables 30, 31, 32, 33 of antenna station 11-3 in a desirable position to the railroad track 19. For example, as illustrated in FIG. 3B, the mounts 18, 18' may mount the plurality of leaky feeder cables 30 to 33 at a certain height above the ground and/or in some position relative to the coach C1, substantially parallel to the railroad track 19. Furthermore, the mounts 18, 18' may allow the leaky feeder cables 30 to 33 to be mounted at a desirable separation distance d3 to each other. The distance d3 can vary from zero, in case both cables are bundled together, to any reasonable distance. Particularly, it may be between 0.5 and 5 times the centre carrier wavelength of the communication channel.

As illustrated in FIG. 3B, when the antenna station is transmitting to the coach C1 (or any other coach of train 10), the leaky feeder cables, e.g. LFCs 30 to 33 of antenna system 11-3A, 11-3A' may typically be mounted lower than the height of the train coach roof 101, i.e. below roof level. In this scenario, there may often be line of sight (LOS) from the antenna stations 11-3A, 11-3A' to the set of antennas mounted on the side of the train that is physically closer to the antennas system 11-3A or closer to the antennas 11-3A' on the other side of the track 19. In the illustrated example in FIGS. 3A and 3B, the set of antenna set A2 may be in LOS communication with the antennas 11-3A of the antenna station 11-3, whilst the antenna set A1 may be in LOS communication with the antennas 11-3A' of the antenna station 11-3.

It is worth noting that the antenna station 11-3 comprising leaky feeders 30 to 32 may be operated using the same type of antennas A11, A12, A21, A22 as described when referring to FIGS. 1 and 2. While this alleviates the need to install additional antennas for the LFC sections along the track 19, a difficulty may arise due to the pattern diversity between the antennas within each set A1, A2. Typically, known leaky feeder systems are designed to communicate with omnidirectional antennas. With a pattern diversity as described for FIG. 1A, for example between the antenna A11 (oriented forward) and the antenna A12 (oriented backward) it may be difficult to sufficiently separate different signal channels in the LFC cables. For that reason it is proposed to introduce a matching directivity or pattern diversity into the LFC on each side of the track, as illustrated with radiation patterns 30, 31, 32, and 33

As shown in FIG. 3A, a pattern diversity in the leaky feeder cables 30 to 33 may be achieved by feeding different signal channels from opposite ends of the respective LFC, for example as illustrated with LFC 30 and LFC 31, where both LFC 30, 31 are shown to be terminated with an exemplary 50 Ohm termination at the non-feeding end. As a result, the cables have a different orientation or radiation pattern as indicated by the orientation of the schematic radiation lobes as shown in FIG. 3A with a dashed outline.

As each of the antenna sets A1, A2 of the example includes at least two antennas A11, A12 and A21, A22, respectively, with at least one antenna of each set oriented in a forward direction and at least one antenna in a backward direction, a 4×4 MIMO communication link can be established within the confines of exemplary LFC corridors 11-3A, 11-3A' to each of the coaches C1, C2 of the train 10 by exploiting for example the pattern diversity of the antenna sets A1, A2 and the pattern diversity of the LFCs 30, 31 and 32, 33 of the antenna sets 11-3A, 11-3A' respectively. Using the example of FIGS. 3A and 3B, the channel s5 is transmitted from LFC 30 on to the antennas A21, the channel s6 is transmitted from LFC 31 to antennas A22, the channel s7 is transmitted from LFC 33 and antennas A11 and the channel s8 is transmitted from LFC 32 to the antennas A12.

The use of leaky feeder cables with pattern diversity on both sides of the vehicle in conjunction with sets of differently oriented antennas with pattern diversity mounted on the vehicle as described above for FIGS. 3A and 3B may be used independently of the aspects of the invention as described for example when referring to FIGS. 1 and 2.

Figure 3C:
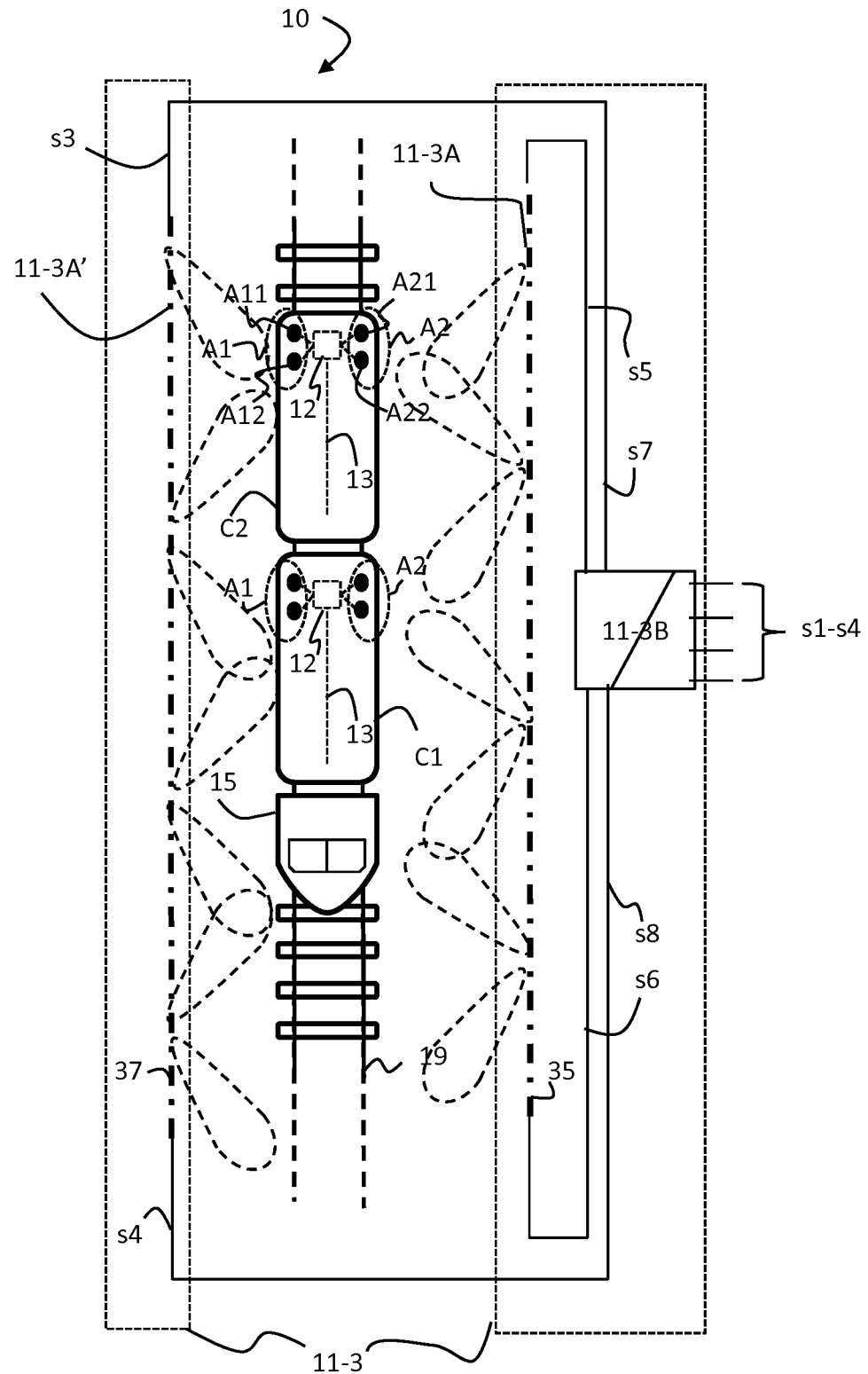
FIG. 3C shows an exemplary train in the vicinity of a variant of a second stationary communication system as shown in FIG. 3A.

It may also be possible to achieve effective pattern diversity using a leaky feeder antenna made up of a single cable instead of two while maintaining the feed of different channels from different ends of the single cable. Such a variant is illustrated in FIG. 3C.

The example of FIG. 3 C includes components already described with reference to FIG. 3A above. However, antenna station 11-3A and 11-3A' may comprise one LFC 35, 36, respectively, instead of a plurality of LFCs 30, 31 and LFC 32, 33. LFCs 35, 36 may be fed from both ends, whereby each end may be fed by a different signal, as illustrated. For example, LFC 35 may be fed by the signals from ports s5 and s6, which may output signals based on the signals on input ports s1 and s2, respectively. Dependent on direction of propagation of the wave inside an LFC cable, 35, 36 the wave arrives at each slot within the cable with certain phase delay. From these slots, the waves propagate in free space to arrive at the antennas A11, A12 of the antenna set A1 on one side or at the antennas A21, A22 of the antenna set A2 on the other side of the vehicle 10, respectively, wherein they superimpose to yield a receive voltage/signal sample. When feeding the same cable such as LFC cable 35 or cable 36 from opposite ends, within the LFC cable the waves travel in the opposite direction and the phases with which these waves arrive at the same slots are different. Since otherwise these waves travel the same paths to arrive at the same receiving antenna, the only difference between the two receive signals depends exclusively on the arrival phase of the waves propagating in different directions at each slot within the LFC 35, 36.

During its journey the train 10 can move from zones where the predominant mode of communication is provided by RF antennas such as antenna system 11-1A, 11-2A as shown in FIGS. 1-2 to zones where the predominant mode of communication is provided by leaky feeders such as leaky feeder antenna system 11-3A as shown in FIG. 3 and vice versa.

Communication systems such as those described above may enhance the mobile communications to and/from the train using two or more different stationary communication systems configurations to establish the communication link to the moving vehicle offers advantages in areas where for example the installation of the preferred stationary communication system is not feasible and the second, under normal circumstances less preferred stationary communication system, has to be used instead.

It will be appreciated that the communication systems as described above allows the use of the same antennas and repeater equipment on the train without the need of a specific switching device at the transition from the antenna corridors as described above with reference to FIGS. 1-2 to zones equipped with LFC as described above with reference to FIG. 3. It may also be possible to use the same DAS system for both types of zones.

Though described using a train 10 as an example, the systems and methods described above can be applied in any communication system requiring fast switching of in-vehicle equipment between two or more different stationary communications systems along the trajectory of the vehicle. A vehicle may be a coach of a train 10, the train itself or a different type such as guided bus, a car etc.

REFERENCES

U.S. Pat. No. 5,548,835 A (NEC CORP) 12 Feb. 1994
US 2014198715 A (SWISSCOM AG) 17 Aug. 2014

The invention claimed is:

1. A system configured for mounting on a vehicle for providing multiple-input multiple-output (MIMO) based communication between the vehicle and one or more stationary antenna stations located in proximity to a track of the vehicle, the system comprising:
    a first antenna system that comprises a first plurality of antennas and one or more corresponding circuits for handling signals transmitted and/or received via the first plurality of antennas; and
    a second antenna system that comprises a second plurality of antennas and one or more corresponding circuits for handling signals transmitted and/or received via the second plurality of antennas;
    wherein:
        said first plurality of antennas is polarized at least approximately orthogonally to said second plurality of antennas;
        at least one antenna of the first antenna system and at least one antenna of the second antenna system have antenna patterns in at least an approximate opposite direction to at least a second antenna of the first antenna system and at least a second antenna of the second antenna system;
        an antenna pattern of the at least one antenna of the first antenna system and an antenna pattern of the at least one antenna of the second antenna system are directed at least approximately parallel to the track; and
        a line of sight (LOS) between the first antenna system and the second antenna system is at least partially interrupted by the vehicle.

2. The system of claim 1, wherein the first antenna system and the second antenna system are configured for mounting below a roof level of the vehicle.

3. The system of claim 1, wherein the first antenna system and the second antenna system are configured for mounting onto a convex-shaped vehicle roof of the vehicle.

4. The system of claim 1, wherein the first antenna system and the second antenna system are configured for mounting onto the vehicle such that an axis of the first antenna system is at least approximately perpendicular to an axis of the second antenna system.

5. The system of claim 1, wherein the first antenna system and the second antenna system are configured to establish and/or provide a MIMO communication link with the one or more stationary antenna stations.

6. The system of claim 5, wherein the MIMO communication link comprises a 4×4 MIMO communication link.

7. The system of claim 1, comprising a repeater coupled to at least one of the first antenna system and the second antenna system.

8. The system of claim 1, comprising one or more internal antennas coupled to at least one of the first antenna system and the second antenna system, wherein the one or more internal antennas are configured for receiving and transmitting signals within the vehicle.

9. A system configured for mounting along or near a track, for providing multiple-input multiple-output (MIMO) based communications with vehicles travelling on the track, the system comprising:
- a first antenna station that comprises a first antenna system and one or more corresponding transceiver circuits; and
- a second antenna station that comprises a second antenna system and one or more corresponding transceiver circuits;

wherein:
- the first antenna system is configured for providing a first cross-polarized RF radiation pattern when communicating signals of a first signals set along the track in direction of a second antenna station;
- the second antenna system is configured for providing a second cross-polarized RF radiation pattern communicating signals of a second signals set along the track in direction of the first antenna station; and
- the first radiation pattern and the second RF radiation pattern are configured to overlap along a section of the track located between the first and the second antenna station.

10. The system of claim 9, wherein:
- the first antenna system is configured for providing the first radiation pattern when communicating two signal channels from four signals channels along the track in direction of a second antenna station;
- the second antenna system is configured for providing the second radiation pattern when communicating other two signal channels from the four signals channels along the track in direction of the first antenna station.

11. The system of claim 9, wherein at least one of the first antenna station and the second antenna station are coupled to a distributed antenna system.

12. The system of claim 11, wherein the distributed antenna system is configured such that for a vehicle passing an antenna station, signals strength for a signal channel of the communication system remains essentially constant.

13. The system of claim 9, comprising a third antenna station that comprises one or more leaky feeder cables, arranged along sections of the track, to provide cross-polarized beams.

14. The system of claim 13, wherein the one or more leaky feeder cables comprise at least two parallel leaky feeder cables with pattern diversity on each side of the track.

15. The system of claim 14, wherein the at least two parallel leaky feeder cables on one side of the track are connected for signal transmission and terminated at opposite ends.

16. The system of claim 13, wherein third antenna station lacks an antenna system.

* * * * *